Dec. 30, 1969  HANS-JOACHIM M. FÖRSTER  3,486,399
PLANETARY GEAR CHANGE-SPEED TRANSMISSION, ESPECIALLY
FOR MOTOR VEHICLES
Filed April 6, 1967

| GANG | K1 29 | K2 35 | B1 31 | B2 36 | B3 33 | F 25 |
|------|-------|-------|-------|-------|-------|------|
| I    |       |       |       | o     |       | o    |
| II   |       |       | o     | o     |       |      |
| III  | o     |       |       | o     |       |      |
| IV   | o     | o     |       |       |       |      |
| R    |       |       |       |       | o     | o    |

INVENTOR
HANS-JOACHIM M. FÖRSTER

BY

ATTORNEYS

United States Patent Office 3,486,399
Patented Dec. 30, 1969

3,486,399
PLANETARY GEAR CHANGE-SPEED TRANSMISSION, ESPECIALLY FOR MOTOR VEHICLES
Hans-Joachim M. Förster, Stuttgart-Riedenberg, Germany, assignor to Daimler-Benz Aktiengesellschaft, Stuttgart-Unterturkheim, Germany
Filed Apr. 6, 1967, Ser. No. 629,014
Claims priority, application Germany, Apr. 9, 1966, D 49,839
Int. Cl. F16h 57/10
U.S. Cl. 74—763                                32 Claims

ABSTRACT OF THE DISCLOSURE

A planetary four-speed, change-speed transmission, which includes two planetary gear sets, namely, an input planetary gear set and an output planetary gear set, the ring gear of the input planetary gear set serving as input member and the planet carrier of the output planetary gear set serving as output member, and in which the input planetary gear set further includes compound or dual planet gears whose larger gear wheel is in meshing engagement with the input ring gear and with a first smaller sun gear and whose smaller gear wheel is in meshing engagement with a larger sun gear, the planet carrier of the input planetary gear set being connected, on the one hand, with the ring gear of the second planetary gear set, and on the other, by way of a disengageable clutch with the smaller sun gear of the first planetary gear set; the larger sun gear of the first planetary gear set is connected by way of a free-wheeling device with the sun gear of the output planetary gear set, while the free-wheeling device is also adapted to be by-passed by a disengageable clutch in effect connecting the larger sun gear of the input planetary gear set with the sun gear of the output planetary gear set in both directions of rotation. Additionally, the planet carrier as well as the smaller sun gear of the input planetary gear set and the sun gear of the output planetary gear set are adapted to be braked by means of engageable brakes.

BACKGROUND OF THE INVENTION

Figures 1, 2:
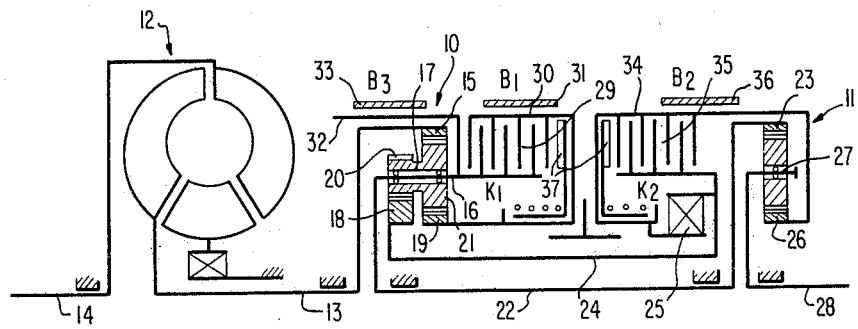

The present invention relates to a planetary-gear, change-speed transmission, especially for motor vehicles, in which the input member of an output planetary gear set is operatively connected directly with one member of an input planetary gear set and the reaction member of the output planetary gear set is operatively connected by way of a free-wheeling clutch with another member of the input planetary gear set, whereby one clutch and one brake each for the output planetary gear set act on the transmission connection thereof from the free-wheeling clutch to the reaction member as described in German patent application D 47,498, filed in Germany, in the name of the assignee of the present application.

Three and four-speed change-speed transmissions of the aforementioned type were proposed in the aforementioned German application. All of the transmissions proposed in this German application are advantageous as regards shifting without group-change as well as the reduction of the number of shifting means. In the proposed four-speed transmission of the prior application, the gear group at the input side consists of two separate planetary gear sets which involve naturally a certain spatial requirement and expenditure.

The present invention aims at an improvement in the last-mentioned respect. The present invention thereby solves the underlying problems in connection with the four-speed transmissions according to the aforementioned prior application in that the input planetary gear set includes a ring gear forming the driving input, two sun gears as well as a planet carrier with at least one compound or tandem planet gear which is provided with two toothed rims of different diameter whereby the planet carrier and the one sun gear serve for the purpose of connection with the output planetary gear set. The solution proposed according to the present invention results in a forward or input gear group compacted into the smallest space. The entire structural length of the transmission is reduced thereby.

With one embodiment according to the present invention, the input ring gear meshes with the larger toothed rim or gear portion of the compound or tandem planet gear or gears and the smaller sun gear also meshing therewith is adapted to be clutched to the carrier which, in its turn, is directly connected with the input member of the output planetary gear set. With this construction, the larger sun gear then meshes with the smaller toothed rim or gear portion of the compound planet gear or gears and is operatively connected with the reaction member of the output planetary gear set.

The embodiment described hereinabove of the present invention may be further developed and perfected in that the compound or dual planet gears face with the smaller toothed rims or gear portions the side of the drive or input and that the planet carrier is extended outwardly on the side facing the drive and is connected with the output planetary gear set whereas on the side facing the output planetary gear set, the planet carrier of the input planetary gear set accommodates the clutch for the connection with one sun gear. This construction results in a very simple and appropriate arrangement of the individual shifting elements as well as in a connection between the individual planetary gear members which can be realized very easily.

Appropriately, a drum externally extending over the compound or dual planet gears for the accommodation of a reverse speed brake is arranged at the planet carrier of the input planetary gear set on the output side thereof. Furthermore, the clutches at the input compound planetary gear set and at the output planetary gear set are arranged mirror-image-like to each other between the two planetary gear sets. In this manner a further structural simplification and reduction of the over-all transmission can be achieved.

Accordingly, it is an object of the present invention to provide a planetary gear, change-speed transmission of the type described above which obviates those shortcomings mentioned hereinabove encountered with the prior art transmissions of analogous construction.

Another object of the present invention resides in a planetary gear change-speed transmission which excels by greater simplicity as well as shorter over-all structural length.

A further object of the present invention resides in a planetary gear change-speed transmission, especially for motor vehicles, in which the various connections between the respective elements of the planetary gear elements can be realized in a very favorable manner from a constructional point of view.

These and further objects, features, and advantages of the present invention will become more obvious from the following description when taken in connection with the accompanying drawing, which shows, for purposes of illustration only, one embodiment in accordance with the present invention, and wherein:

FIGURE 1 is a schematic, cross-sectional view through a four-speed transmission in accordance with the present invention; and FIGURE 2 is the shifting diagram for the four-speed transmission of FIGURE 1.

Referring now to FIGURE 1 of the drawing, the transmission illustrated therein consists of an input compound or dual planetary gear set generally designated by reference numeral 10 and of an output planetary gear set generally designated by reference numeral 11. The compound planetary gear set 10 is driven from the drive shaft 14 by way of a hydrodynamic unit generally designated by reference numeral 12 and the saft 13. The hydrodynamic unit 12 may be a torque converter or a hydraulic coupling of any conventional construction. Of course, a direct drive from the shaft 14, i.e., without hydrodynamic unit, is also within the purview of the present application.

The tandem or compound planetary gear set 10 consists of a ring gear 15 which serves as input member of a planet carrier 16 having at least one compound or tandem planet gear 17 and two sun gears 18 and 19. The compound planet gear 17 includes a smaller toothed rim or gear portion 20 which faces the drive or input side. The larger toothed rim or gear portion 21 faces the output side. The input ring gear 15 and the smaller sun gear 19 mesh with the larger toothed rim or gear portion 21. Only the larger sun gear 18 meshes with the smaller toothed rim or gear portion 20.

The planet carrier 16 is extended toward the drive or input side and is connected thereat with an intermediate shaft 22 which, in its turn, is securely connected with the ring gear 23 of the output planetary gear set 11. This ring gear 23 serves as input member of the output planetary gear set 11. The larger sun gear 18 is operatively connected by means of a hollow shaft 24 and by way of a free-wheeling clutch 25 of conventional construction with the sun gear 26 of the output planetary gear set which serves as reaction member thereof. The carrier 27 of the output planetary gear set 11 serves as output and is connected directly with the output shaft 28.

The planet carrier 16 is also extended at the input compound planetary gear set 10 toward the output side and accommodates thereat a clutch 29 which serves for the connection with the smaller sun gear 19. The outer drum portion 30 of this clutch 29 is connected with the sun gear 19 and accommodates a brake 31 by means of which the sun gear 19 is adapted to be braked. A further drum portion 32 is connected to the planet carrier 16 which extends outwardly over the compound planetary gear set 10 and on which acts a brake 33 for the reverse speed.

The hollow shaft 24 is connected with the outer ring or race of the free-wheeling device 25. The inner ring or race of the free-wheeling device 25 is operatively connected with the connecting line 34 leading to the sun gear 26 serving as reaction member. A clutch 35 and a brake 36 act on this connecting line 34 as disclosed also in the aforementioned German application. The two clutches 29 and 35 are arranged mutually mirror-image-like. The actuating pistons 37 thereof face one another which considerably facilitates the supply of the pressure medium to the same.

OPERATION

According to the diagram of FIGURE 2, for the first speed only the brake 36 is engaged whereas all other shifting elements remain disengaged. As a result thereof, the reaction sun gear 26 of the output planetary gear set 11 is held stationary. Simultaneously therewith also the inner ring or race of the free-wheeling device 25 is held stationary. Since this free-wheeling device 25 prevents a rotation of the outer ring or race with respect to the inner ring or race thereof in the backward direction, also the larger sun gear 18 of the input compound planetary gear set 10 cannot rotate in the backward direction. Consequently, in first speed, a speed reduction occurs in both planetary gear sets 10 and 11.

For second speed the brake 31 is additionally engaged in addition to brake 36. As a result thereof, the smaller sun gear 19 of the input compound planetary gear set 10 is now held stationary. Whereas the output planetary gear set 11 maintains its speed reduction, only the considerably smaller speed reduction of the gears 15 and 19 are now effective in the input compound planetary gear set 10, i.e., the planet carrier 16 rotates therefore considerably faster so that altogether a smaller over-all reduction results. The larger sun gear 18 is thereby driven in the forward direction of rotation so that the free-wheeling device 25 disengages.

For the third speed, in addition to the brake 36, the clutch 29 is engaged whereas the brake 31 is disengaged. In this manner, the input compound planetary gear set 10 is locked in itself so that only the reduction of the output planetary gear set 11 is effective.

For the fourth speed, the brake 36 is now disengaged and in its place the clutch 35 is now engaged. The clutch 29 thereby remains engaged. In this manner, both planetary gear sets are locked in themselves and rotate as the unit in the direct speed.

The reverse speed is obtained in that the brake 33 is engaged and all other shifting members are disengaged. As a result thereof, the planet carrier 16 of the input compound planetary gear set 10 as well as simultaneously also the ring gear 23 of the output planetary gear set 11 stand still, i.e., are held stationary. A reversal of the direction of rotation now occurs in the compound planetary gear set 10, and the sun gear 26 of the planetary gear set 11 is now driven in the backward direction of rotation from the larger sun gear 18 by way of the locking free-wheeling device 25 and the connecting line 34.

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A planetary gear change-speed transmission, especially for motor vehicles, comprising input planetary gear set means having a plurality of rotating elements, output planetary gear set means having a plurality of rotating elements, one element in each planetary gear set means forming the input element, another element thereof forming the reaction member and a still other element forming an output member thereof, connecting means operatively interconnecting respective elements of the planetary gear set means to achieve four predetermined, fixed and selectively engageable forward speeds and a reverse speed, including a plurality of disengageable means providing said four forward speeds and said reverse speed by said planetary gear set means, said connecting means operatively connecting the input member of the output planetary gear set means with a first element of the input planetary gear set means and the reaction member of the output planetary gear set means by way of one-way clutch means with a second element of said input planetary gear means, said input planetary gear set means including a ring gear forming the input element, two sun gears, and a planet carrier supporting at least one compound planet gear means having two toothed rim portions, and the planet carrier and one sun gear of the input planetary gear set means serving for the connection with the output planetary gear set means.

2. A transmission according to claim 1, wherein some of said engageable means act on the connection between the one-way clutch means and the reaction member of the output planetary gear set means.

3. A transmission according to claim 2, wherein the input ring gear of the input planetary gear set means meshingly engages with the toothed rim portion of larger diameter of the compound planet gear means, the smaller sun gear which meshes with the larger toothed rim portion of the compound planet gear means being adapted to be connected by way of one of said engageable means with the planet carrier of said input planetary gear set means and said last-mentioned planet carrier being operatively connected with the input member of the output planetary gear set means.

4. A transmission according to claim 3, wherein the larger sun gear engages with the toothed rim portion of smaller diameter of the compound planet gear means and is operatively connected with the reaction member of the output planetary gear set means.

5. A transmission according to claim 4, wherein the compound planet gear means faces with the smaller toothed rim portion the input side of the transmission and the planet carrier of the input planetary gear set means protrudes outwardly on the input side and is operatively connected with the output planetary gear set means whereas said planet carrier accommodates on the side facing the output planetary gear set means the disengageable means for the connection with the sun gear of smaller diametric dimension.

6. A transmission according to claim 5, further comprising drum means extending externally over compound planetary gear set means and arranged at the planet carrier thereof on the output side, said drum means serving for the accommodation of a disengageable means in the form of a brake for the reverse speed.

7. A transmission according to claim 6, wherein the disengageable means constituting clutches are arranged between the two planetary gear set means in a mirror-image-like manner.

8. A transmission according to claim 1, wherein the input ring gear of the input planetary gear set means meshingly engages with the toothed rim portion of larger diameter of the compound planet gear means, the smaller sun gear which meshes with the larger toothed rim portion of the compound planet gear means being adapted to be connected by way of one of said engageable means with the planet carrier of said input planetary gear set means and said last-mentioned planet carrier being operatively connected with the input member of the output planetary gear set means.

9. A transmission according to claim 8, wherein the larger sun gear engages with the toothed rim portion of smaller diameter of the compound planet gear means and is operatively connected with the reaction member of the output planetary gear set means.

10. A transmission according to claim 1, wherein the compound planet gear means faces with the smaller toothed rim portion the input side of the transmission and the planet carrier of the input planetary gear set means protrudes outwardly on the input side and is operatively connected with the output planetary gear set means whereas said planet carrier accommodates on the side facing the output planetary gear set means the disengageable means for the connection with the sun gear of smaller diametric dimension.

11. A transmission according to claim 10, wherein the disengageable means constituting clutches are arranged between the two planetary gear set means in a mirror-image-like manner.

12. A transmission according to claim 10, further comprising drum means extending externally over compound planetary gear set means and arranged at the planet carrier thereof on the output side, said drum means serving for the accommodation of a disengageable means in the form of a brake for the reverse speed.

13. A transmission according to claim 12, wherein the disengageable means constituting clutches are arranged between the two planetary gear set means in a mirror-image-like manner.

14. A transmission according to claim 1, wherein the larger sun gear engages with the toothed rim portion of smaller diameter of the compound planet gear means and is operatively connected with the reaction member of the output planetary gear set means.

15. A transmission according to claim 1, wherein the disengageable means constituting clutches are arranged between the two planetary gear set means in a mirror-image-like manner.

16. A motor vehicle change-speed transmission comprising input means, output means, means operatively connecting said input means with said output means including an input planetary gear and an output planetary gear, each planetary gear having a plurality of rotary members and including planet gear means in meshing engagement with annular gears and a planetary gear carrier for said planet gear means, one member of the output planetary gear constituting the input member thereof, the planet gear means of the input planetary gear being a double planet gear having gear portions of different diameter in meshing engagement with individually rotatable annular gears of complementary different diameters, the first means directly connecting in all speeds the input member of the output planetary gear with one member of the input planetary gear, another member of the output planetary gear constituting a reaction member thereof, second means operatively connecting said reaction member with another member of the input planetary gear, and means for selectively engaging four fixed forward speeds and a reverse speed produced exclusively by said input and output planetary gears including engageable means constituting clutches and brakes, one brake being operatively connected with the output planetary gear to brake said reaction member and one clutch being operatively connected with the output planetary gear to establish a connection between said reaction member and another member of the input planetary gear in the fourth speed to thereby lock the output planetary gear.

17. A motor vehicle change-speed transmission providing mechanically four fixed forward speeds and a reverse speed, comprising input means, output means, compound input planetary gear means and an output planetary gear means operatively connected between said input and output means, each planetary gear means having a plurality of rotatable members and including planet gear means in meshing engagement with annular gears and a planet gear carrier for said planet gear means, one member of the output planetary gear constituting the input member thereof, another member of the output planetary gear constituting a reaction member thereof, the output means being operatively connected with a further member of the output planetary gear, the planet gear means of the compound input planetary gear means being a tandem planet gear with toothed rim portions of different diameter in meshing engagement with two annular gears of analogously different diameter, one member of the input planetary gear being adapted to be operatively connected with the input member of the output planetary gear, another member of the input planetary gear formed by an annular gear being operatively connected with the reaction member of the output planetary gear by way of a one-way clutch means, and said input means being operatively connected in all forward speeds with the same member formed by another annular member of the input planetary gear, and further means for selectively engaging said speeds including a plurality of connecting means operatively connected respective members of the input and output planetary gear group and a plurality of engageable means operatively coordinated to said connecting means and rotatable members in such a manner that only two engageable means are engaged for each speed and at least one previously engaged engageable means of the pre-existing speed remains engaged when shifting up to the next higher speed requiring the engagement of a further engageable means, and one of said engageable means being connected in parallel with said one-way clutch means.

18. A motor vehicle change-speed transmission comprising input means, output means, an input compound planetary gear means and an output planetary gear means, the output planetary gear means having a plurality of members and including at least one planet gear means in meshing engagement with two annular gears consisting of ring and sun gears and a planet carrier for said planet gear means, the input planetary gear means having a plurality of members and including a compound planet gear means with two gear portions, annular gears consisting of ring and sun gears and a planet carrier, one gear portion meshing with two annular gears forming sun and ring gears while the other gear portion meshes with a further annular gear, one annular gear of the output planetary gear means constituting the input member thereof, first means directly connecting the input member of the output planetary gear group with the planet carrier of the input planetary gear means, the other annular member of the output planetary gear group constituting a reaction member thereof, second means operatively connecting said reaction member with said further member of the input planetary gear means, the input means being connected in all speeds with said ring gear, and means for selectively engaging four fixed forward speeds and one reverse speed of said transmission including engageable means constituting clutches and brakes, at least one brake being operatively coordinated to the reaction member of the output planetary gear group to selectively brake said reaction member in both directions of rotation and one clutch being operatively coordinated to said reaction member to directly connect the same by said second means with said further annular member of the input planetary gear means.

19. A transmission according to claim 18, further comprising one-way clutch means in said second connecting means in parallel with said clutch.

20. In a planetary gear change-speed transmission, especially for motor vehicles, which includes an input planetary gear set having a plurality of elements and output planetary gear set having a plurality of elements, one element of each planetary gear set forming the input member, another element thereof forming the reaction member and a still other element forming an output member thereof, and connecting means operatively interconnecting respective elements of the planetary gear set means to achieve by said two planetary gear sets four predetermined and selectively engageable forward speeds and a reverse speed, including a plurality of disengageable means operatively connected with the elements of said two planetary gear sets, connecting means operatively connecting the input member of the output planetary gear set with one element of the input planetary gear set and the reaction member of the output planetary gear set with another element of said input planetary gear means, wherein the improvement comprises in one of the planetary gear sets at least one dual planet gear means having two toothed portions of different diameter, three annular gears consisting of sun and ring gears meshing with said two toothed portions, one said annular gear constituting the sole input member of the input planetary gear set while a second of the annular gears constitutes an output member of the input planetary gear set for the transfer of driving torque by way of said connecting means to the output planetary gear set, and the third of said annular gears is adapted to be connected with another element of the one planetary gear set by way of one of said engageable means, a planet carrier for said planet gear means and forming said one element of the input planetary gear set operatively connected by said connecting means with the input member of the input planetary gear set while said another element of the input planetary gear set is formed by one of said ring and sun gears, and one of said engageable means being operable to brake said third annular gear to obtain a reduced forward speed.

21. The improvement according to claim 20, wherein the input member of the input planetary gear set is a ring gear and meshingly engages with the toothed portion of larger diameter, the smaller of the sun gears, meshing with the larger toothed portion, being adapted to be connected by way of one of said engageable means with said planet carrier, and said planet carrier being operatively connected with the input member of the output planetary gear set.

22. The improvement according to claim 21, wherein the larger sun gear engages with the toothed portion of smaller diameter and is operatively connected with the reaction member of the output planetary gear set.

23. A transmission according to claim 1, wherein one of said disengageable means is a clutch means operatively connected in series in the connecting means, which operatively connects the reaction member of the output planetary gear means with the second element of said input planetary gear means.

24. A transmission according to claim 23, wherein said last-mentioned clutch means is operatively connected in parallel with said one-way clutch means to bridge the latter.

25. A transmission according to claim 16, wherein said one brake and said one clutch act directly on said second means.

26. A transmission according to claim 25, wherein said one clutch is included in said second means and a one-way clutch means is connected in parallel with said one clutch.

27. A transmission according to claim 25, wherein said one clutch is series-connected in said second means, and said second means inclusive said one clutch directly connects said reaction member with said another member of the input planetary gear.

28. A transmission according to claim 27, wherein a one-way clutch means is connected in parallel with said one clutch.

29. A transmission according to claim 17, wherein said one engageable means is a clutch, and wherein a brake formed by another engageable means is operable to brake in both directions of rotation the reaction member of the output planetary gear means.

30. A transmission according to claim 20, wherein the connecting means connecting the reaction member of the output planetary gear set with the another element of said input planetary gear means includes one-way clutch means, one of said disengageable means being a clutch means operatively connected in parallel with said one-way clutch means.

31. A transmission according to claim 30, wherein one of said disengageable means is a brake means selectively operable to brake the reaction member of the output planetary gear set in both directions of rotation.

32. A transmission according to claim 20, wherein the input planetary gear set includes a ring gear in meshing engagement with a planet gear of said dual planet gear means, and input means connected only with said ring gear in all speeds of the transmission.

References Cited

UNITED STATES PATENTS

| | | | |
|---|---|---|---|
| 772,274 | 10/1904 | Day | 74—767 |
| 1,383,988 | 7/1921 | De Normanville | 74—759 |
| 2,251,625 | 8/1941 | Hale | 74—759 X |
| 2,645,137 | 7/1953 | Roche | 74—763 X |
| 2,815,684 | 12/1957 | Roche | 74—759 X |
| 2,890,601 | 6/1959 | Forster | 74—759 X |
| 2,892,365 | 6/1959 | Winther | 74—763 X |
| 2,970,497 | 2/1961 | Foerster | 74—759 X |
| 3,118,319 | 1/1964 | Straub | 74—759 X |

DONLEY J. STOCKING, Primary Examiner

T. C. PERRY, Assistant Examiner

U.S. Cl. X.R.

74—765